US012436549B2

(12) United States Patent
Sakai et al.

(10) Patent No.: US 12,436,549 B2
(45) Date of Patent: Oct. 7, 2025

(54) FLOWRATE CONTROL DEVICE, FLOWRATE CONTROL METHOD, AND FLUID SUPPLY SYSTEM

(71) Applicant: SHINWA CONTROLS CO., LTD, Kawasaki (JP)

(72) Inventors: Katsutoshi Sakai, Kawasaki (JP); Yuki Fukuzawa, Kawasaki (JP)

(73) Assignee: Shinwa Controls Co., Ltd., Kawasaki (JP)

( * ) Notice: Subject to any disclaimer, the term of this patent is extended or adjusted under 35 U.S.C. 154(b) by 434 days.

(21) Appl. No.: 18/041,859

(22) PCT Filed: Aug. 6, 2021

(86) PCT No.: PCT/JP2021/029257
§ 371 (c)(1),
(2) Date: Feb. 16, 2023

(87) PCT Pub. No.: WO2022/039047
PCT Pub. Date: Feb. 24, 2022

(65) Prior Publication Data
US 2023/0333575 A1 Oct. 19, 2023

(30) Foreign Application Priority Data
Aug. 21, 2020 (JP) .................. 2020-140330

(51) Int. Cl.
*G05B 11/42* (2006.01)
*G05D 7/06* (2006.01)
(52) U.S. Cl.
CPC ........... *G05D 7/0623* (2013.01); *G05B 11/42* (2013.01)
(58) Field of Classification Search
USPC ....................................... 700/282
See application file for complete search history.

(56) References Cited

U.S. PATENT DOCUMENTS 4,872,763 A * 10/1989 Higuchi ................. G01G 13/06
706/900
2010/0089049 A1* 4/2010 Matsuura ............... E02F 9/2296
60/419

FOREIGN PATENT DOCUMENTS

| JP | 6104443 B1 | 3/2017 |
| TW | 201626126 A | 7/2016 |

OTHER PUBLICATIONS

CN_1630841_A (Year: 2005).*

(Continued)

*Primary Examiner* — Hien D Khuu
(74) *Attorney, Agent, or Firm* — BURR PATENT LAW, PLLC

(57) ABSTRACT

A flowrate control device includes: a storing unit that stores opening degree characteristic of a flowrate regulating valve; an inputting unit that inputs a target flowrate of the fluid flowing out from the flowrate regulating valve, and a flowrate change velocity to reach the target flowrate; a detecting unit that detects, from when the control of the flowrate to the target flowrate is started, the flowrate of the fluid flowing out from the flowrate regulating valve at a predetermined cycle; and an opening-degree regulating unit that regulates an opening degree of the flowrate regulating valve. The opening-degree regulating unit determines a difference between a detected flowrate detected by the detecting unit and a planned flowrate in the course of achieving the target flowrate, the planned flowrate corresponding to the detected flowrate and being defined by the flowrate change velocity and the number of detection executed by the detecting unit.

9 Claims, 3 Drawing Sheets

(56) References Cited

OTHER PUBLICATIONS

JP_2018031453_A (Year: 2018).*
CN_106125790_A (Year: 2016).*
CN_107765716_A (Year: 2018).*
International Search Report and Written Opinion (Application No. PCT/JP2021/029257) dated Oct. 19, 2021.
English translation of the International Preliminary Report on Patentability (Chapter I) dated Mar. 2, 2023 (Application No. PCT/JP2021/029257).

* cited by examiner

FLOWRATE CONTROL DEVICE, FLOWRATE CONTROL METHOD, AND FLUID SUPPLY SYSTEM

FIELD OF THE INVENTION

The present invention relates to a flowrate control device and a flowrate control method for controlling a flowrate of a fluid ejected from a fluid machine, such as a pump, by means of a flowrate regulating valve, and a fluid supply system comprising the flowrate control device.

BACKGROUND ART

A flowrate control device that controls a flowrate of a liquid ejected from a pump by means of a flowrate regulating valve has been conventionally known. Such a flowrate control device generally calculates a difference between a detected flowrate from a flowmeter, which is arranged downstream of a flowrate regulating valve, and a target flowrate, and controls an opening degree of the flowrate regulating valve to eliminate the difference.

Various types of valves can be employed as the above flowrate regulating valve. The flowrate regulating valve has a relationship between an opening degree and a Cv value (capacity factor), which is referred to as opening degree characteristic. Such opening degree characteristic depends on a valve type, for example. Typical opening degree characteristic includes linear characteristic, quick opening characteristic, equal percentage characteristic, etc.

The use of a flowrate regulating valve with linear characteristic is desired when precise flow control is required. Regarding a flowrate regulating valve, which is a three-way valve, it is generally difficult to achieve the linear characteristic as compared with a two-way valve. In view of this, the applicant has previously proposed in JP6104443B a technique of improving linear characteristic of a three-way valve.

SUMMARY OF THE INVENTION

For example, there is a system that supplies a temperature-controlled liquid from a flowrate regulating valve to a temperature control target, and then circulates the liquid. For example, the system may gradually supply at a constant rate (i.e., linearly) the liquid having a low temperature to the temperature control target having a high temperature, after the system has once stopped. In this case, there is a possibility that a liquid, which has been previously supplied to the temperature control target and remains there with a high temperature, abruptly returns to the system side because of the opening degree characteristic of the flowrate regulating valve. It may be desirable to avoid such a situation from the viewpoint of preventing heat shock to a flow path. Namely, it may be desirable to stably change a flowrate as desired.

However, even when a flowrate regulating valve with linear characteristic is used in the above system, there may be more or less non-linear behavior, which may make it difficult to change a flowrate as desired. In addition, it may be necessary for the above system to use a flowrate regulating valve with non-linear characteristic. However, also in this case, it is desired to change a flowrate as desired as much as possible, in order to avoid a risk of heat sock as described above.

The present invention has been made in consideration of the aforementioned circumstances. The object of the present invention is to provide a flowrate control device, a flowrate control method, and a fluid supply system, which are capable of stably changing a flowrate irrespective of opening degree characteristic of the flowrate regulating valve.

A flowrate control device according to one embodiment of the present invention is a flowrate control device that controls a flowrate of a fluid flowing out from a flowrate regulating valve by changing an opening degree of the flowrate regulating valve, the flowrate control device comprising: a storing unit that stores opening degree characteristic of the flowrate regulating valve, the opening degree characteristic defining a relationship between an opening degree and a Cv value of the flowrate regulating valve; an inputting unit that inputs a target flowrate of the fluid flowing out from the flowrate regulating valve, and a flowrate change velocity to reach the target flowrate; a detecting unit that detects, from when the control of the flowrate to the target flowrate is started, the flowrate of the fluid flowing out from the flowrate regulating valve at a predetermined cycle; and an opening-degree regulating unit that determines a difference between a detected flowrate detected by the detecting unit and a planned flowrate in the course of achieving the target flowrate, the planned flowrate corresponding to the detected flowrate and being defined by the flowrate change velocity and the number of detection executed by the detecting unit, and, when there is a difference therebetween, calculates a regulated opening degree corresponding to the planned flowrate from the Cv value of the opening degree characteristic so as to regulate an opening degree of the flowrate regulating valve by feedback control that uses, as a target value, an opening-degree operation amount that is calculated based on an opening degree difference between the regulated opening degree and a current opening degree of the flowrate regulating valve.

The opening-degree regulating unit may perform the opening degree regulation that uses, as the target value, the opening-degree operation amount calculated based on the opening degree difference, until the detecting unit detects the flowrate next time, and when the detecting unit detects the flowrate anew, the opening-degree regulating unit may calculate the opening-degree operation amount anew.

The opening-degree regulating unit may calculates the opening-degree operation amount by PID calculation.

The flowrate regulating valve may be a three-way valve.

The three-way valve may include a reception port, a supply port and a bypass port, and the flowrate control device according to one embodiment may further comprise an instructing unit that gives an instruction for prompting input of the target flowrate and the flowrate change velocity when the reception port and the supply port are moved from a closed state into a connection state.

The opening degree characteristic of the flowrate regulating valve may be non-linear characteristic.

The flowrate regulating valve may be configured to change an opening degree based on rotation of a stepping motor, and the opening-degree regulating valve may increase or decrease driving pulses per the same time based on the opening-degree operation amount.

In addition, a flowrate control method according to one embodiment of the present invention is a flowrate control method that controls a flowrate of a fluid flowing out from a flowrate regulating valve by changing an opening degree of the flowrate regulating valve, the flowrate control method comprising:

a determining step that determines opening degree characteristic of the flowrate regulating valve, the opening degree characteristic defining a relationship between an opening degree and a Cv value of the flowrate regulating valve;

a deciding step that decides a target flowrate of the fluid flowing out from the flowrate regulating valve, and a flowrate change velocity to reach the target flowrate;

a detecting step that detects, from when the control of the flowrate to the target flowrate is started, the flowrate of the fluid flowing out from the flowrate regulating valve at a predetermined cycle; and an opening-degree regulating step that determines a difference between a detected flowrate detected by the detecting step and a planned flowrate in the course of achieving the target flowrate, the planned flowrate corresponding to the detected flowrate and being defined by the flowrate change velocity and the number of detection executed by the detecting step, and, when there is a difference therebetween, calculates a regulated opening degree corresponding to the planned flowrate from the Cv value of the opening degree characteristic so as to regulate an opening degree of the flowrate regulating valve by using, as a target value, an opening-degree operation amount that is calculated based on an opening degree difference between the regulated opening degree and a current opening degree of the flowrate regulating valve.

In addition, a fluid supply system according to one embodiment of the present invention is a fluid supply system comprising: the abovementioned flowrate control device, and a fluid circulation device including a fluid flow path provided with the flowrate regulating valve.

The present invention can stably change a flowrate irrespective of opening degree characteristic of the flowrate regulating valve.

DETAILED DESCRIPTION OF THE INVENTION

Figure 1:
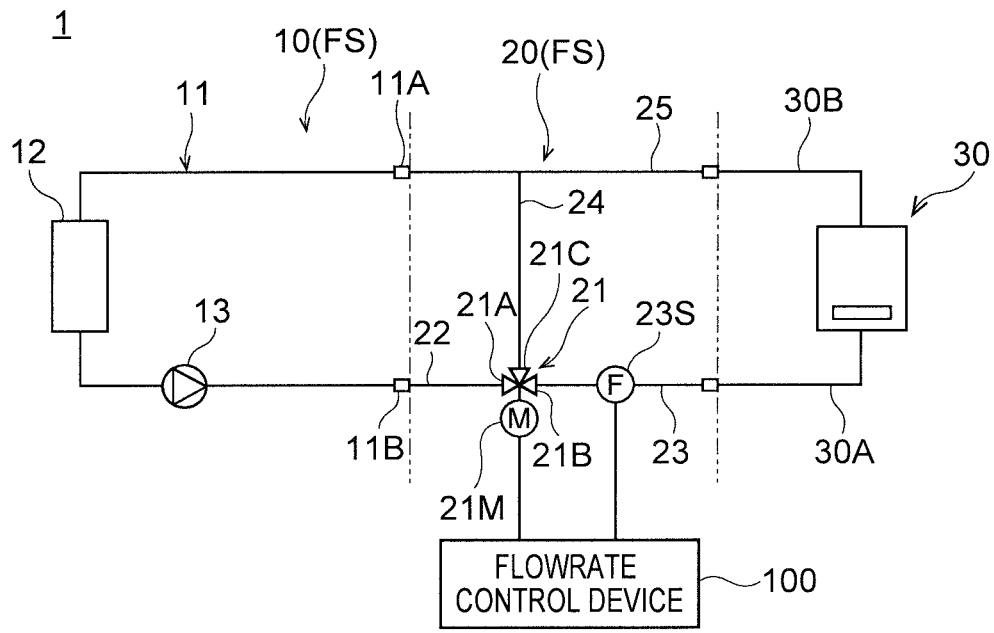
FIG. 1 is a view showing a schematic structure of a chiller comprising a flowrate control device according to one embodiment of the present invention.

A chiller 1 comprising a flowrate control device 100 according to one embodiment of the present invention is described herebelow. FIG. 1 is a view showing a schematic structure of the chiller 1 which is an example of a fluid supply system.

<General Structure of Chiller>

As shown in FIG. 1, the chiller 1 comprises a cooling flow path unit 10 including a cooling flow path 11, a heat exchanger 12 and a pump 13, a valve unit 20 including a flowrate regulating valve 21, and a flowrate control device 100. The valve unit 20 detachably connects the cooling flow path unit 10 and an external device 30 which is a temperature control target. In this embodiment, the cooling flow path unit 10 and the valve unit 20 constitute a fluid circulation device FS.

In the cooling flow path unit 10, the heat exchanger 12 and the pump 13 are arranged on the cooling flow path 11 through which a liquid as a fluid flows. When the pump 13 is driven, the liquid flows through the cooling flow path 11 into the heat exchanger 12. The heat exchanger 12 in this embodiment is connected to a refrigerator, not shown, and cools the liquid flowing thereinto by means of heat exchange between the liquid and a coolant expanded by the refrigerator. The liquid flowing through the cooling flow path unit 10 may be, for example, brine or any other cooling liquid.

When the chiller 1 is normally operated, the pump 13 is controlled such that a liquid flows at a constant flowrate.

The cooling flow path 11 includes an upstream end 11A and a downstream end 11B which are detachably connected to the valve unit 20.

The valve unit 20 includes a flowrate regulating valve 21 which is a three-way valve, a reception flow path 22, a supply flow path 23, a bypass flow path 24, and a return flow path 25.

The flowrate regulating valve 21 includes a reception port 21A, a supply port 21B, and a bypass port 21C. The flowrate regulating valve 21 can switch between a "first state" in which the reception port 21A and the supply port 21B are connected fully open and the reception port 21A and the bypass port 21C are closed, and a "second state" in which the reception port 21A and the supply port 21B are closed and the reception port 21A and the bypass port 21C are connected fully open.

A state between the aforementioned first state and the second state is referred to as "intermediate state" hereunder. In this intermediate state, the reception port 21A and the supply port 21B are connected, as well as the reception port 21A and the bypass port 21C are connected, so that a liquid received by the reception port 21A can be distributed to the supply port 21B and the bypass port 21C.

The flowrate regulating valve 21 includes a stepping motor 21M as a driving part for a valve disc (valve element). The flowrate regulating valve 21 regulates a position of the valve disc based on rotation of the stepping motor 21M to regulate an opening degree between the reception port 21A and the supply port 21B, and an opening degree between the reception port 21A and the bypass port 21C. The driving part for the valve disc is not limited to the stepping motor 21M but may be a solenoid, for example.

The reception flow path 22 detachably connects the downstream end 11B of the cooling flow path 11B and the reception port 21A of the flowrate regulating valve 21.

The supply flow path 23 detachably connects the supply port 21B of the flowrate regulating valve 21 and an upstream flow path 30A of the external device 30. The supply flow path 23 is provided with a flowrate sensor 23S that detects a flowrate of a liquid flowing through the supply flow path 23.

The bypass flow path 24 detachably connects the bypass port 21C of the flowrate regulating valve 21 and the return flow path 25.

The return flow path 25 detachably connects the upstream end 11A of the cooling flow path 11 and a downstream flow path 30B of the external device 30. The bypass flow path 24 connects to an intermediate portion of the return flow path 25 to allow a liquid to flow into the return flow path 25.

The external device 30 has a working part 31 connected to the aforementioned upstream flow path 30A and the downstream flow path 30B. The external device 30 regulates a temperature of the working part 31 by means of a liquid supplied from the upstream flow path 30A. The downstream flow path 30B allows the liquid flowing out from the working part 31 to flow into the return flow path 25.

The external device 30 in this embodiment is a membrane coating device which is a semiconductor manufacturing device, by way of example. During a normal membrane coating operation, the external device 30 controls a temperature of a wafer by a liquid supplied thereto. On the other hand, upon stop of the membrane coating operation, the external device 30 is configured to perform inside cleaning. When performing the inside cleaning, the external device 30 firstly stops the liquid supply from the valve unit 20, controls a temperature of its inside to a high temperature, and then performs the inside cleaning.

The flowrate control device 100 can supply a liquid from the cooling flow path unit 10 only to the external device 30 by controlling the flowrate regulating valve 21 into the "first state" in which the reception port 21A and the supply port 21B are connected fully open and the reception port 21A and the bypass port 21C are closed. In addition, the flowrate control device 100 can circulate the liquid from the cooling flow path unit 10 via the valve unit 20 without supplying the liquid to the external device 30 by controlling the flowrate regulating valve 21 into the "second state" in which the reception port 21A and the supply port 21B are closed and the reception port 21A and the bypass port 21C are connected fully open.

In addition, the flowrate control device 100 can supply a part of the liquid from the cooling flow path unit 10 to the external device 30 and can allow another part of the liquid to flow into the bypass flow path 24 by controlling the flowrate regulating valve 21 into the "intermediate state". The flowrate control device 100 is electrically connected respectively to the flowrate sensor 23S and the stepping motor 21M so as to control an operation of the flowrate regulating valve 21 based on a detected flowrate from the flowrate sensor 23S. More specifically, the flowrate control device 100 can control a flowrate of a liquid flowing out from the supply port 21B and a flowrate of a liquid flowing out from the bypass port 21C by changing an opening degree of the flowrate regulating valve 21 based on a detected flowrate from the flowrate sensor 23C. The flowrate control device 100 is described in detail hereunder.

<Flowrate Control Device>

The flowrate control device 100 is a controller that performs flowrate control. The controller may comprise a CPU, a ROM, etc., for example. In this case, the flowrate control device 100 performs various processes such as a process of acquiring information from the flowrate sensor 23S and a process of transmitting a control signal to the stepping motor 21M, etc., in accordance with a program stored in the ROM. The flowrate control device 100 may comprise another processor or electric circuit (e.g., FPGA (Field Programmable Gate Alley), etc.).

Figure 2:
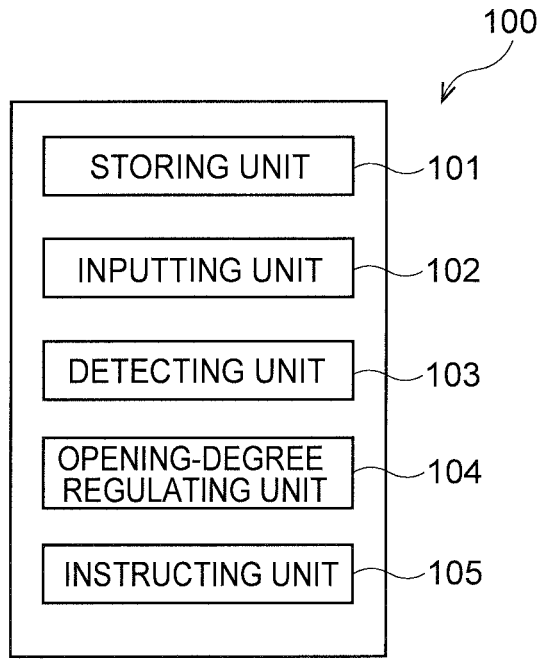
FIG. 2 is a block diagram showing a functional structure of the flowrate control device shown in FIG. 1.

FIG. 2 is a block diagram showing a functional structure of the flowrate control device 100. As shown in FIG. 2, the flowrate control device 100 includes a storing unit 101, an inputting unit 102, a detecting unit 103, an opening-degree regulating unit 104, and an instructing unit 105. The storing unit 101 is formed of a part of a storage unit such as the ROM. The functional units other than the storing unit 101 are realized by executing the program stored in the storage unit of the ROM, etc.

The storing unit 101 stores opening degree characteristic of the flowrate regulating valve 21, which define a relationship between an opening degree of the flowrate regulating valve 21 and a Cv value (capacity factor).

Figure 3:
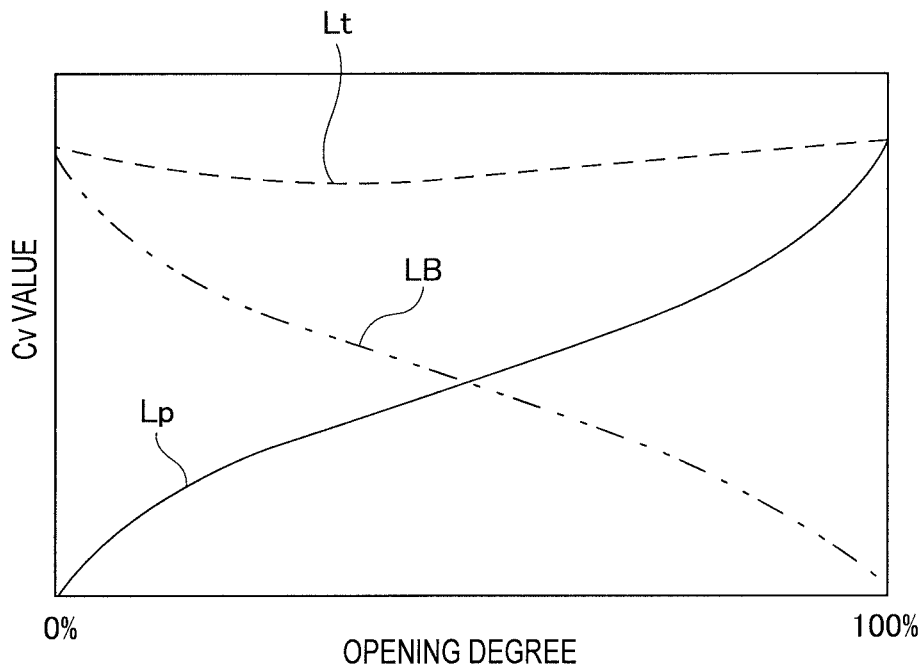
FIG. 3 is a view showing opening degree characteristic of a flowrate regulating valve provided on the chiller shown in FIG. 1.

FIG. 3 shows an example of the opening degree characteristic of the flowrate regulating valve 21, which are stored in the storing unit 101. In FIG. 3, an axis of abscissas shows an opening degree, and an axis of ordinate shows a Cv value. 0% written on the axis of abscissas means that the opening degree between the reception port 21A and the supply port 21B is 0%, i.e., the reception port 21A and the supply port 21B are fully closed. 100% written on the axis of abscissas means that the opening degree between the reception ort 21A and the supply port 21B is 100%, i.e., the reception port and the supply port 21B are connected fully open. Conversely, 0% written on the axis of abscissas means that the opening degree between the reception port 21A and the bypass port 21C is 100%, i.e., the reception port 21A and the bypass port 21C are connected fully open. 100% written on the axis of abscissas means that the reception port 21A and the bypass port 21C are fully closed.

A solid line indicated by a reference numeral LP in FIG. 3 shows a relationship between the opening degree between the reception port 21A and the supply port 21B, and the Cv value. A two-dot chain line indicated by a reference numeral LB shows a relationship between the opening degree between the reception port 21A and the bypass port 21C, and the Cv value. A broken line indicated by a reference numeral Lt shows a total Cv value. As shown in FIG. 3, the opening degree characteristic of the flowrate regulating valve 21 in this embodiment are non-linear characteristic.

An opening degree for allowing a liquid flowing out from the flowrate regulating valve 21 to have a desired flowrate can be calculated with the use of a Cv value. In this embodiment, when a liquid flowing out from the flowrate regulating valve 21 is controlled to a desired flowrate, an opening degree is determined from a Cv value corresponding to the desired flowrate, and the flowrate regulating valve 21 is controlled to have the determined opening degree.

Returning to FIG. 2, the inputting unit 102 is a unit for inputting a target flowrate of a liquid flowing out from the flowrate regulating valve 21, and a flowrate change velocity to reach the target flowrate.

In more detail, the inputting unit 102 displays, on a not-shown display device, a image that prompts a user to input a target flowrate of a liquid supplied from the supply port 21B to the external device 30, and a flowrate change velocity to reach it, and inputs to the inside (e.g., storage unit) the target flowrate and the flowrate change velocity to hold them in accordance with the input operation of the user. In this embodiment, liters/min (L/min) is used as a unit for the target flowrate, and liters/mine is (L/mini) used as a unit for the flowrate change velocity, but such units are not particularly limited.

Figure 4:
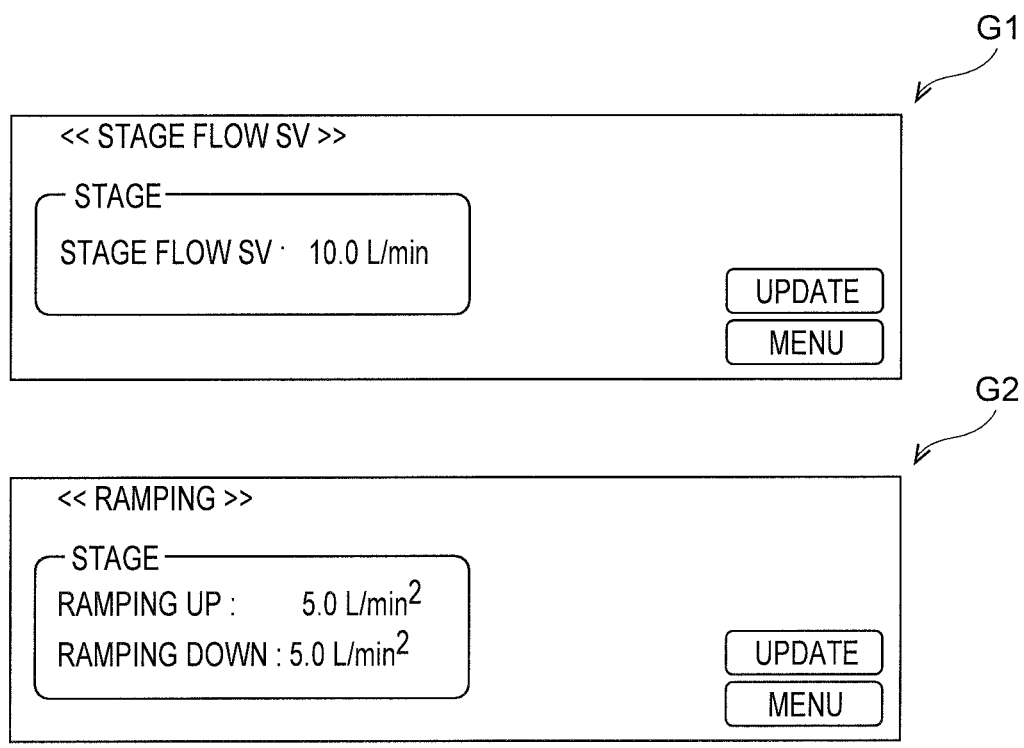
FIG. 4 is a view showing an example of an input image of a target flowrate and a flowrate change velocity displayed by the flowrate control device shown in FIG. 1 on a display device.

FIG. 4 is a view showing an example of an input image of a target flowrate and a flowrate change velocity displayed by the inputting unit 102 of the flowrate control device shown 100 on the display device. An input image G1 of the target flowrate (target-flowrate input image G1) is shown in the upper row of FIG. 4, and an input image G2 of the flowrate change velocity (flowrate-change-velocity input image G2) is shown in the lower row of FIG. 4.

In the target-flowrate input image G1, 10.0 L/min in the notation "STAGE FLOW SV: 10.0 L/min" shows the target flowrate. The target flowrate is updated by changing the displayed target flowrate and operating the "UPDATE" key. In the flowrate-change-velocity input image G2, 5.0 L/mine in the notation "RAMPING UP: 5.0 L/mine" shows the flowrate change velocity when a flowrate of a liquid supplied to the external device 30 is increased. In addition, 5.0 L/mine in the notation "RAMPING DOWN: 5.0 L/mine" shows the flowrate change velocity when a flowrate of a liquid supplied to the external device 30 is decreased. The flowrate change velocity is updated by changing the displayed flowrate change velocity and operating the "UPDATE" key. Hereunder, the input image G1 and the input image G2 are collectively referred to as "ramping setting image".

Returning again to FIG. 2, the detecting unit 103 is electrically connected to the flowrate sensor 23S to detect the flowrate of the fluid flowing out from the flowrate regulating valve 21 at a predetermined cycle from when the control of the flowrate to the "target flowrate" is started. The "target flowrate" herein means a target flowrate inputted with the target-flowrate input image G1 when a flowrate of a liquid supplied to the external device 30 is increased. On the other hand, when a flowrate of a liquid supplied to the external device 30 is decreased, 0 L/min is set as the target flowrate, for example.

Next, the opening-degree regulating unit 104 regulates an opening degree of the flowrate regulating valve 21 by means of feedback control based on a detected flowrate detected by the detecting unit 103, a target flowrate, and a flowrate change velocity. Hereunder, mere description of opening degree of the flowrate regulating valve 21 means an opening degree between the reception port 21A and the supply port 21B.

As a specific process, the opening-degree regulating unit 104 determines a difference between a detected flowrate detected by the detecting unit 103 and a planned flowrate in the course of achieving the target flowrate, the planned flowrate corresponding to the detected flowrate and being defined by the flowrate change velocity and the number of detection executed by the detecting unit 103.

Then, when there is a difference therebetween, the opening-degree regulating unit 104 calculates, as a regulated opening degree, an opening degree corresponding to the planned flowrate from a Cv value of the opening degree characteristic.

Then, the opening-degree regulating unit 104 regulates an opening degree of the flowrate regulating valve 21 by feedback control that uses, as a target value, an opening-degree operation amount that is calculated based on an opening degree difference between the calculated regulated opening degree and a current opening degree of the flowrate regulating valve 21.

In more detail, the opening-degree regulating unit 104 performs the opening degree regulation of the flowrate regulating valve 21 wherein the opening-degree operation amount as calculated above is used as a target value, until the detecting unit 103 detects a flowrate a next time. Then, when the detecting unit 103 detects a flowrate anew, the opening-degree regulating unit 104 calculates a opening-degree operation amount anew.

However, after the opening degree has reached the target value, a flowrate detection may be performed and thereafter a new opening-degree operation amount may be calculated. In this embodiment, the opening-degree operation amount is calculated by PID calculation. The "current opening degree of the flowrate regulating valve 21" may be determined from an encoder or the like of the stepping motor 21M in the flowrate control device 100, or may be determined by storing an accumulated driving pulses thereof.

During the opening-degree regulation, the opening-degree regulating unit 104 converts the aforementioned opening-degree operation amount into a driving pulse, and then inputs the driving pulse to the stepping motor 21M. At this time, the opening-degree regulating unit 104 increases or decreases the number of driving pulses per the same time in accordance with the aforementioned opening-degree operation amount. If the number of driving pulses per time becomes excessively large, there is a possibility that the stepping motor 21M cannot follow them. Thus, when the number of driving pulses per time exceeds an upper limit value, an opening-degree operation amount may be set by truncating the excessive number of driving pulses.

As described above, the opening-degree regulating unit 104 in this embodiment performs, not the feedback control based on a difference between a detected flowrate and a final "target flowrate", but the feedback control based on a difference between a detected flowrate and a "planned flowrate" in the course of achieving the target flowrate, and calculates an opening-degree operation amount in consideration of the opening degree characteristic of the flowrate regulating valve 21. In this case, a flowrate of a liquid supplied from the flowrate regulating valve 21 changes in a state close to a liner function V×t defined by a flowrate change velocity V and a time t, to stably reach a target value.

On the other hand, the instructing unit 105 is a unit that gives an instruction for prompting input of a target flowrate and a flowrate change velocity when the reception port 21A and the supply port 21B are moved from a closed state into a connection state. Specifically, the instructing unit 105 automatically displays the input images G1 and G2 shown in FIG. 4.

As described above, when performing the inside cleaning, the external device 30 firstly stops the liquid supply from the valve unit 20, controls a temperature of its inside (working part 31) to a high temperature, and then performs the inside cleaning. After the inside cleaning, when a liquid is abruptly supplied again from the valve unit 20 to the external device 30, there is a possibility that a liquid, which remains in the working part 31 of the external device 30 with a high temperature, abruptly returns to the valve unit 20 and the cooling flow path unit 10 to deliver heat shock to them. In order to avoid this situation, the instructing unit 105 is configured to give an instruction for prompting a user to input a target flowrate and a flowrate change velocity.

<Operation>

Next, an example of the operation of the flowrate control device 100 is described with reference to FIG. 5.

Figure 5:
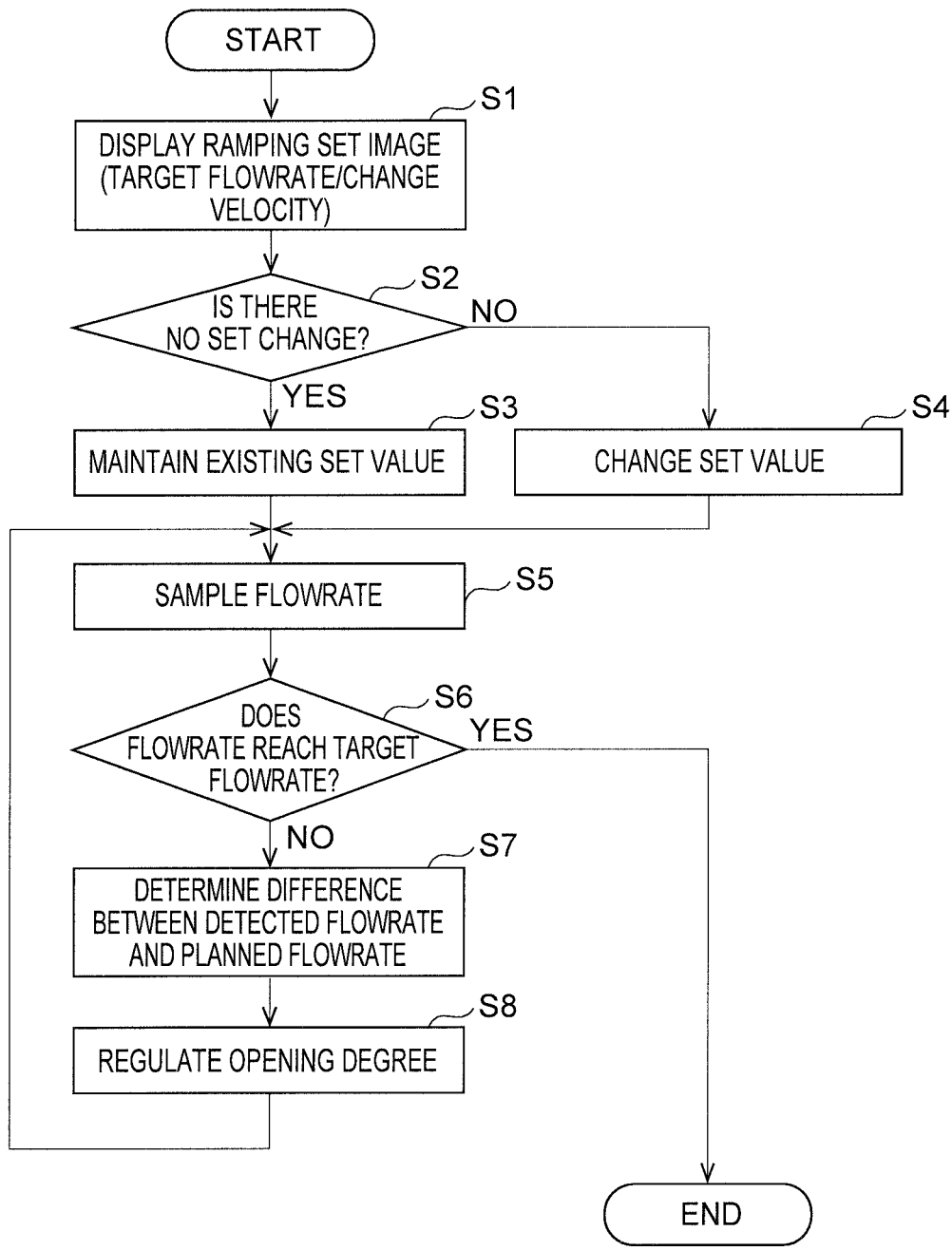
FIG. 5 is a flowchart describing an example of an operation of the flowrate control device shown in FIG. 1.

FIG. 5 is a flowchart describing an example of an operation of the flowrate control device 100. The below-described operation example is an operation wherein the flowrate regulating valve 21 is controlled from the aforementioned second state (state in which all the liquid is bypassed) to a state in which a liquid is supplied to the external device 30 at a target flowrate, while the flowrate regulating valve 21 changes a flowrate in accordance with a set flowrate change velocity.

When a command for moving the reception port 21A and the supply port 21B from the closed state (i.e., the second state) to the connected state is issued, an operation shown in FIG. 5 is started. In the operating, firstly, the inputting unit 102 displays the ramping set image (G1, G2) which is an instruction for prompting input of a target flowrate and a flowrate change velocity (step S1). When the ramping set image (G1, G2) is displayed, a user can input a target flowrate and a flowrate change velocity.

Then, in a step S2, the inputting unit 102 determines whether the target flowrate and/or the flowrate change velocity have been changed. When the target flowrate and/or the flowrate change velocity have not been changed, the inputting unit 102 maintains the existing set values as they are in a step S3. When the target flowrate and/or the flowrate change velocity have been changed, the inputting unit 102 changes the values of the target flowrate and/or the flowrate change velocity and stores them in a step S4. In this embodiment, even when the values of the target flowrate and the flowrate change velocity are maintained as the existing values, the process will not proceed without operating the operation image. The processes in the steps S2 to S4 may be omitted at the user's option.

Then, in a step S5 the detecting unit 103 detects (samples) a flowrate (detected flowrate) of a liquid flowing out from the flowrate regulating valve 21 based on information from the flowrate sensor 23S.

Then, in a step S6, the opening-degree regulating unit 104 determines whether the detected flowrate detected by the detecting unit 103 reaches the target flowrate. When the opening-degree regulating unit 104 determines that the detected flowrate reaches the target flowrate, the process is ended. Otherwise, the process is transferred to a step S7.

In the succeeding step S7, the opening-degree regulating unit 104 determines a difference between the detected flowrate detected by the detecting unit 103 and a planned flowrate in the course of achieving the target flowrate, the planned flowrate corresponding to the detected flowrate and being defined by the flowrate change velocity and the number of detection executed by the detecting unit 103. The planned flowrate can be calculated by multiplying the flowrate change velocity by nt/60 wherein t (second) is a sampling cycle of the detecting unit 103 and n is the number of times of the detection.

Then, in a step S8, when the difference is determined in the step S7, the opening-degree regulating unit 104 calculates an opening degree (regulated opening degree) corresponding to the planned flowrate from a Cv value of the opening degree characteristic. On the other hand, when no difference is found in the step S7, the opening-degree regulating unit 104 in this embodiment does not calculate a regulated opening degree. When calculating the regulated opening degree, the opening-degree regulating unit 104 regulates an opening degree of the flowrate regulating valve 21 by the feedback control which uses, as a target value, an opening-degree operation amount that is calculated based on an opening degree difference between the regulated opening degree and a current opening degree of the flowrate regulating valve 21. On the other hand, when not calculating the regulated opening degree, the opening-degree regulating unit 104 performs feedback control wherein the opening-degree operation amount is 0. After the opening-degree regulating unit 104 has given the opening-degree operation amount to the flowrate regulating valve 21, the process returns to the step S5.

The flowrate control device 100 according to the aforementioned embodiment performs, not the feedback control based on a difference between a detected flowrate and a target flowrate, but the feedback control based on a difference between a detected flowrate and a "planned flowrate" in the course of achieving the target flowrate, and calculates an opening-degree operation amount in consideration of the opening degree characteristic of the flowrate regulating valve 21. A flowrate control method according to such an embodiment is described hereunder step by step.

First, a determining step that determines opening degree characteristic of the flowrate regulating valve 21, the opening degree characteristic defining a relationship between an opening degree and a Cv value of the flowrate regulating valve 21 is performed. Next, a deciding step that decides a target flowrate of the fluid flowing out from the flowrate regulating valve 21, and a flowrate change velocity to reach the target flowrate is performed. Next, a detecting step that detects, from when the control of the flowrate to the target flowrate is started, the flowrate of the fluid flowing out from the flowrate regulating valve 21 at a predetermined cycle is performed. Next, an opening-degree regulating step that determines a difference between a detected flowrate detected by the detecting step and a planned flowrate in the course of achieving the target flowrate, the planned flowrate corresponding to the detected flowrate and being defined by the flowrate change velocity and the number of detection executed by the detecting step, and, when there is a difference therebetween, calculates a regulated opening degree corresponding to the planned flowrate from the Cv value of the opening degree characteristic so as to regulate an opening degree of the flowrate regulating valve 21 by using, as a target value, an opening-degree operation amount that is calculated based on an opening degree difference between the regulated opening degree and a current opening degree of the flowrate regulating valve 21 is performed.

Such an embodiment allows a flowrate of a liquid supplied from the flowrate regulating valve 21 to be changed like a linear function to a target flowrate along a set flowrate change velocity. This can make stable the flowrate irrespective of the opening degree characteristic of the flowrate regulating valve 21.

In this embodiment, the opening-degree regulating unit 104 performs the opening degree regulation that uses, as the target value, the calculated opening-degree operation amount, until the detecting unit 103 detects the flowrate next time, and when the detecting unit 103 detects the flowrate anew, the opening-degree regulating unit 104 calculates the opening-degree operation amount anew. In this case, since the behavior of the flowrate regulating valve 21 can be smoothened, abrupt flowrate change can be effectively suppressed.

In addition, in this embodiment, the aforementioned opening-degree operation amount is calculated by PID calculation. This also enables the smooth behavior of the flowrate regulating valve 21, which can effectively suppress an abrupt flowrate change.

Although the embodiment of the present invention has been described above, the present invention is not limited to the aforementioned embodiment, and the above embodiment can be variously modified. For example, the flowrate control device 100 according to the above embodiment is applied to flowrate control of a liquid, but the flowrate control device 100 may be applied to flowrate control of a gas discharged by a blower, for example. In the above embodiment, the example in which the opening degree characteristic of the flowrate regulating valve 21 are non-linear characteristic. However, the opening degree characteristic of the flowrate regulating valve 21 are not particularly limited, and the present invention is effective in the case of any opening degree characteristic.

What is claimed is:

1. A flowrate control device that controls a flowrate of a fluid flowing out from a flowrate regulating valve by changing an opening degree of the flowrate regulating valve, the flowrate control device comprising:
   a storing unit that stores opening degree characteristic of the flowrate regulating valve, the opening degree characteristic defining a relationship between the opening degree and a Capacity Factor (Cv) value of the flowrate regulating valve;

an inputting unit that inputs a target flowrate of the fluid flowing out from the flowrate regulating valve, and a flowrate change velocity to reach the target flowrate;

a detecting unit that detects, from when the control of the flowrate to the target flowrate is started, the flowrate of the fluid flowing out from the flowrate regulating valve at a predetermined cycle; and an opening-degree regulating unit that determines a difference between the detected flowrate detected by the detecting unit and a planned flowrate in the course of achieving the target flowrate, wherein the planned flowrate corresponding to the detected flowrate is defined by the flowrate change velocity and a number of detection executed by the detecting unit, and, when the difference is determined, calculates a regulated opening degree corresponding to the planned flowrate from the Cv value of the opening degree characteristic and regulates the opening degree of the flowrate regulating valve by feedback control that uses, as a target value, an opening-degree operation amount that is calculated based on an opening degree difference between the regulated opening degree and a current opening degree of the flowrate regulating valve.

2. The flowrate control device according to claim 1, wherein the opening-degree regulating unit performs the opening degree regulation that uses, as the target value, the opening-degree operation amount calculated based on the opening degree difference, until the detecting unit detects a flowrate next time, and when the detecting unit detects the flowrate anew, the opening-degree regulating unit calculates the opening-degree operation amount anew.

3. The flowrate control device according to claim 1, wherein the opening-degree regulating unit calculates the opening-degree operation amount by Proportional Integral Derivative (PID) calculation.

4. The flowrate control device according to claim 1, wherein the flowrate regulating valve is a three-way valve.

5. The flowrate control device according to claim 4, wherein the three-way valve includes a reception port, a supply port and a bypass port, and the flowrate control device further comprises an instructing unit that gives an instruction for prompting input of the target flowrate and the flowrate change velocity when the reception port and the supply port are moved from a closed state into a connection state.

6. The flowrate control device according to claim 1, wherein the opening degree characteristic of the flowrate regulating valve is non-linear characteristic.

7. The flowrate control device according to claim 1, wherein the flowrate regulating valve is configured to change the opening degree based on rotation of a stepping motor, and the opening-degree regulating unit increases or decreases driving pulses per same time based on the opening-degree operation amount.

8. A flowrate control method that controls a flowrate of a fluid flowing out from a flowrate regulating valve by changing an opening degree of the flowrate regulating valve, the flowrate control method comprising:

a determining step that determines opening degree characteristic of the flowrate regulating valve, the opening degree characteristic defining a relationship between the opening degree and a Capacity Factor (Cv) value of the flowrate regulating valve;

a deciding step that decides a target flowrate of the fluid flowing out from the flowrate regulating valve, and a flowrate change velocity to reach the target flowrate;

a detecting step that detects, from when the control of the flowrate to the target flowrate is started, the flowrate of the fluid flowing out from the flowrate regulating valve at a predetermined cycle; and an opening-degree regulating step that determines a difference between the detected flowrate detected by the detecting step and a planned flowrate in the course of achieving the target flowrate, wherein the planned flowrate corresponding to the detected flowrate is defined by the flowrate change velocity and a number of detection executed by the detecting step, and, when the difference is determined, calculates a regulated opening degree corresponding to the planned flowrate from the Cv value of the opening degree characteristic and regulates the opening degree of the flowrate regulating valve by using, as a target value, an opening-degree operation amount that is calculated based on an opening degree difference between the regulated opening degree and a current opening degree of the flowrate regulating valve.

9. A fluid supply system comprising: a flowrate control device according to claim 1, and a fluid circulation device having a fluid flow path provided with the flowrate regulating valve.

* * * * *